(12) United States Patent
Robrecht et al.

(10) Patent No.: US 11,292,224 B2
(45) Date of Patent: Apr. 5, 2022

(54) PROCESS FOR PRODUCING A SANDWICH COMPONENT, CORE FOR A SANDWICH COMPONENT, AND SANDWICH COMPONENT

(71) Applicant: Airbus Operations GmbH, Hamburg (DE)

(72) Inventors: Volker Robrecht, Hamburg (DE); Gilles Debril, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 472 days.

(21) Appl. No.: 15/999,200

(22) Filed: Aug. 17, 2018

(65) Prior Publication Data

US 2019/0077111 A1 Mar. 14, 2019

(30) Foreign Application Priority Data

Aug. 17, 2017 (DE) ...................... 10 2017 214 340.1

(51) Int. Cl.
*B32B 3/12* (2006.01)
*B33Y 80/00* (2015.01)
*B33Y 10/00* (2015.01)
*B29C 70/68* (2006.01)
*B29C 70/38* (2006.01)
(Continued)

(52) U.S. Cl.
CPC ............... *B32B 3/12* (2013.01); *B29C 48/11* (2019.02); *B29C 64/118* (2017.08); *B29C 70/38* (2013.01); *B29C 70/688* (2013.01); *B29D 24/005* (2013.01); *B29D 99/0021* (2013.01); *B29D 99/0089* (2013.01); *B32B 7/12* (2013.01); *B33Y 10/00* (2014.12); *B33Y 80/00* (2014.12); *B29C 70/70* (2013.01); *B29C 70/72* (2013.01); *B29L 2031/608* (2013.01)

(58) Field of Classification Search
None
See application file for complete search history.

(56) References Cited

U.S. PATENT DOCUMENTS 5,688,353 A 11/1997 Dublinski et al.
2002/0141632 A1 10/2002 Engelbart et al.
(Continued)

FOREIGN PATENT DOCUMENTS

DE 10 2012 016 309 A1 2/2014

OTHER PUBLICATIONS

Bitzer, T.; Honeycomb Technology.; Springer-Science + Business Media, B.V., pp. Contents 7, 33, 91. (Year: 1997).*
(Continued)

*Primary Examiner* — David Sample
*Assistant Examiner* — Elizabeth Collister
(74) *Attorney, Agent, or Firm* — Greer, Burns & Crain, Ltd.

(57) ABSTRACT

A process for producing a sandwich component. A first covering layer is formed on a molding surface of a molding tool; a core is produced by building up a cell structure having a multiplicity of cells in a thickness direction on the first covering layer via an additive production process; and a second covering layer is formed on a deposition surface of the core, the surface being situated on the opposite side from the first covering layer. A core for a sandwich component is furthermore described, as is a sandwich component.

5 Claims, 10 Drawing Sheets

(51) Int. Cl.
  *B29D 24/00* (2006.01)
  *B29C 48/11* (2019.01)
  *B32B 7/12* (2006.01)
  *B29C 70/70* (2006.01)
  *B29L 31/60* (2006.01)
  *B29D 99/00* (2010.01)
  *B29C 64/118* (2017.01)
  *B29C 70/72* (2006.01)

(56) References Cited

U.S. PATENT DOCUMENTS

2004/0048027 A1* 3/2004 Hayes .................... B29C 64/10
  428/53
2013/0273347 A1 10/2013 Jacobsen et al.
2018/0229443 A1* 8/2018 Pham .................... B29C 64/106

OTHER PUBLICATIONS

German Search Report for corresponding German Patent Application No. 10-2017-214-340.1 dated Aug. 10, 2018 (6 pages).

* cited by examiner

Detail X:

Detail X:

PROCESS FOR PRODUCING A SANDWICH COMPONENT, CORE FOR A SANDWICH COMPONENT, AND SANDWICH COMPONENT

CROSS-REFERENCES TO RELATED APPLICATIONS

This application claims the benefit of the German patent application No. 10 2017 214 340.1 filed on Aug. 17, 2017, the entire disclosures of which are incorporated herein by way of reference.

BACKGROUND OF THE INVENTION

The present invention relates to a process for producing a sandwich component, to a core for a sandwich component, and to a sandwich component.

Structural components with a "sandwich" construction usually have at least one outer, covering layer extending in a sheet-like manner and a core layer adjoining the latter. The core layer is generally designed as a honeycomb structure composed of a material of low density. The covering layer is usually designed as a thin, mechanically robust sheet-like layer. In this way, a relatively high mechanical strength or stiffness is achieved with a low component weight, for which reason structural components of sandwich construction are used in many different ways, especially also in aircraft and spacecraft construction.

WO 2015/105859 A1 describes a core layer for a sandwich component which is produced from a multiplicity of open or closed cells by means of a 3-D printing process. The covering layers of the sandwich component and the core are usually each produced separately and then joined to one another, e.g., adhesively bonded to one another.

SUMMARY OF THE INVENTION

It is one of the objects of the present invention to provide an improved process, in particular a process for producing a sandwich component which is improved in respect of process speed. It is another object of the present invention to provide an improved core for a sandwich component, in particular a core which simplifies the production of the sandwich component and/or which has improved mechanical properties.

These objects are each achieved by the subjects of the independent claims.

Advantageous embodiments and refinements will become apparent from the dependent claims that refer back to the independent claims, in conjunction with the description.

According to a first aspect of the invention, a process for producing a sandwich component is provided. According to the invention, a first covering layer is formed on a molding surface of a molding tool. In this step, a continuous layer extending in a sheet-like manner is formed. This can be achieved, for example, by depositing fiber tapes on the molding surface. In this process, "prepreg" tapes, i.e., tapes of a fiber material impregnated with a resin or matrix material, are deposited on a molding surface along a deposition direction, e.g., with the aid of a deposition head. This can comprise the formation of a plurality of plies of fiber tapes lying one on top of the other, wherein the fiber tapes within one layer preferably have the same fiber orientation and the fiber tapes of an adjacently situated layer preferably have a fiber orientation that differs from the fiber orientation of the layer situated underneath. The fiber tapes are optionally deposited in a state in which the matrix material is in a viscous state of aggregation, at least on the surface, or the matrix material is converted into a viscous state immediately after deposition by means of a supply of heat, e.g., with the aid of a heating device provided on the deposition head. As a result, the individual fiber tapes and, where applicable, the individual fiber tape plies melt. Thus, a monolithic, continuous first covering layer extending in a sheet-like manner is formed. Here, an outer surface of the first covering layer rests on the molding surface of the molding tool. An inner surface of the first covering layer is oriented oppositely to the outer surface.

As an alternative, the first covering layer can also be formed by laying and, at the same time, optionally deforming a semifinished fiber product extending in a sheet-like manner on the molding surface of the molding tool. The semifinished fiber product can be designed, in particular, as a plate- or mat-shaped sheet-like semifinished product which has a plurality of layers of fiber plies embedded in matrix material. This semifinished product is pressed against the molding surface of the molding tool and thus correspondingly shaped in a state in which the matrix material is at least partially in a viscous state of aggregation. As an option, hardening or solidification of the matrix material can take place before the next step of the process is carried out.

In a further step, a core of the sandwich component is produced by building up a cell structure having a multiplicity of cells in a thickness direction on the first covering layer by means of an additive production process. A 3-D printing process, in which the core is produced, is thus carried out directly on the inner surface of the first covering layer. In this way, the core is joined to the first covering layer even while it is being produced. This speeds up and simplifies the production of the sandwich component since two process steps are combined in this way. Furthermore, 3-D printing offers exceptional design freedom and, inter alia, allows individually adapted cell structures to be produced with a manageable outlay, structures which it would only be possible to produce with a considerable outlay, if at all, by conventional methods.

The cell structure is built up in a thickness direction from the inner surface of the lower covering layer. A multiplicity of individual cells is formed, which, in particular, can be formed with a plurality of cell walls as closed cells. The cells can be designed as convex polyhedra, for example. A polyhedron is referred to as convex if the line connecting two points of the polyhedron lies fully within the polyhedron. It is possible, for example, to provide cells in the form of a cuboid, a hexahedron, an octahedron, a truncated octahedron, a tetrahedron, a double tetrahedron, a polygonal prism, a dodecahedron, an icosahedron, an icosidodecahedron or the like. The thickness direction is transverse to the inner surface of the lower covering layer. In particular, a cell structure having a thickness which is constant or which varies over the extent of the inner surface is formed. Those cells of the cell structure which are opposite one another and are situated at the outside in relation to the thickness direction form a deposition surface spaced apart by the thickness of the cell structure.

In a further step, a second covering layer of the sandwich component is formed on the deposition surface of the core which is situated on the opposite side from the first covering layer. In particular, the deposition of the second covering layer on the deposition surface of the core can be performed by means of the same device and in the same way as described for the first covering layer, in particular by depositing fiber tapes or by placing and, if appropriate, deforming a semifinished fiber product extending in a sheet-like manner on the deposition surface. By means of the formation of the second covering layer directly on the core, said layer is joined to the core during the very process of deposition itself. Thus, an additional process step is eliminated and the process is sped up even more. Furthermore, the second covering layer adapts to the surface profile of the deposition surface as it is being deposited on the deposition surface of the core. In this way, close, extensive contact between the core and the second covering layer is achieved, reducing the risk of delamination between the covering layer and the core.

By means of the process according to the invention, a sandwich component can be produced in a single tool assembly, in particular at a single workstation, and in a particularly rapid way. The first covering layer can be produced in an automated way by depositing fiber tapes or by forming, in particular hot forming, on a molding surface. For this purpose, a deposition device operating in an automated way, such as a deposition head or an end effector, can be used in each case. By producing the core directly on the first covering layer by means of an additive production process, a large degree of design freedom is made possible in respect of the core, and it is possible to dispense with complex tools. Since 3-D printing devices operate on the basis of data models, it is possible to dispense with manual work steps, such as manual alignment of the core or similar, which is often necessary with conventional processes. Furthermore, direct production of the core on the first covering layer avoids alignment errors and thus improves the quality of the sandwich component. The second covering layer can also be produced in an automated manner, similarly to the first covering layer. By virtue of the fact that this is implemented directly on the core, high precision in the positioning of the covering layer is achieved in this case too. By means of the process according to the invention, the sandwich component can thus be produced in a kind of integral process or integrated process, in which all the work steps can be carried out in an automated way and at a single workstation. As a result, transfer paths for the individual components and waiting times between the process steps are shortened or avoided, and the production time is thereby shortened overall.

According to one embodiment of the process, it is envisaged that the fiber tapes for the formation of the first covering layer and/or the second covering layer comprise a thermoplastic matrix material, or the semifinished fiber product for the formation of the first covering layer and/or the second covering layer comprises a thermoplastic matrix material, e.g., polyphenylene sulfide, PPS for short, polyetheretherketone, PEEK for short, or a similar thermoplastic material. In particular, fiber tapes or semifinished fiber products based on thermoplastics are used to produce the covering layers. This offers the advantage, in particular, that the matrix material can easily be melted slightly by supplying heat, and no additional heat treatment is required to cure the matrix material. In particular, it is possible in this way to dispense with treatment of the covering layers in an autoclave, thereby further accelerating the process.

According to another embodiment, an FDM 3-D printing process is carried out as an additive production process to produce the core. Here, FDM is an abbreviation for "fused deposition modeling". In this process, the walls that form the cells are produced by liquefying a wire- or tape-shaped plastics material by heating and applying it to the inner surface of the first covering layer by extrusion by means of a nozzle. The plastics material then hardens at the desired position by cooling. The cells are usually built up by repeatedly traversing a respective working plane and then moving the working plane upward in a stacking action, giving rise to the cell structure layer by layer.

According to one embodiment, the cell structure of the core is built up from a thermoplastic material. In this case, thermoplastic materials, e.g., polycarbonate, PC for short, polyetherimide, PEI for short, or similar thermoplastics are used, in particular. As a particularly advantageous possibility, the matrix material of the first and the second covering layer as well as the material of the core can each be built up from a thermoplastic material. In this way, a particularly reliable and mechanically robust joint between the core and the covering layers is achieved.

According to one embodiment of the process, it is envisaged that the cell structure of the core is formed with a deposition boundary region which is situated on the opposite side from the first covering layer in relation to the thickness direction and which has a higher volume-related cell density than an inner region of the cell structure adjoining it in the thickness direction. At the boundary of the cell structure, therefore, a cross-sectional region which forms the deposition surface is produced. In this cross-sectional region, therefore, there are more cells within a predetermined volume than within the same volume in an inner region of the cross section which adjoins it in relation to the thickness direction. In this way, any openings in the deposition surface which are delimited by cell walls are reduced in size. As a result, there is better support for the fiber tapes as they are deposited on the deposition surface of the core, with the result that depressions are reliably avoided. Furthermore, the contact surface between the core and the second covering layer is enlarged, improving the adhesion between these layers. Another advantage of this configuration consists in the fact that the mechanical stiffness, in particular the bending resistance of the core, is increased.

According to another embodiment, the cells which are situated on the opposite side from the first covering layer in relation to the thickness direction and which form the deposition surface can be designed in such a way that a longitudinal extent of the cells extends along a deposition direction, in which the fiber tapes are deposited with their fiber longitudinal direction. According to this embodiment, the outermost cells in relation to the thickness direction are designed in such a way that the fibers of the fiber tape extend along the longitudinal extent of openings in the deposition surface which are bounded by cell walls when said fibers are deposited in a certain direction on the deposition surface of the core. If rectangular openings, for example, are formed in the deposition surface by cell walls of the cells, the cell walls are aligned in such a way that, when the fiber tapes are deposited, the fibers extend along the longitudinal side of the rectangular opening. This alignment offers the advantage that hardly any matrix material situated between the fibers hangs down into the opening, thereby reliably avoiding depressions in the covering layer.

According to another embodiment, the cells which are situated on the opposite side from the first covering layer in relation to the thickness direction and which form the deposition surface are filled with a filling material. In this way, the openings in the deposition surface which are bounded by cell walls are completely closed. A particularly large contact surface for the second covering layer is thereby made available, bringing about extremely reliable adhesion between the covering layer and the core. Furthermore, depressions in the covering layer are avoided. Moreover, it is also possible in this way to reduce the risk that water or, more generally, liquids will enter the interior of the core layer.

The filling of the cells to form the deposition surface can be accomplished, in particular, by means of the additive production process during the building up of the cell structure. In this case, therefore, the outermost cells in relation to the thickness direction are formed directly as filled, solid cells during the buildup thereof. As an alternative, it is also possible for filling of the cells with a filling material, e.g., the material from which the cells themselves are formed, or with a foam material to take place subsequently.

According to another embodiment, provision can be made for the cell structure of the core to be constructed with a contact boundary region which directly adjoins the first covering layer in relation to the thickness direction and which has a higher volume-related cell density than an inner region of the cell structure adjoining it in the thickness direction. It is also possible in this contact boundary region to make provision for the cells of the cell structure which are in direct contact with the first covering layer to be filled with a filling material. These optional configurations improve adhesion between the first covering layer and the core and the mechanical resistance of the core. In the case where the cells are filled, the penetration of liquid into the interior of the cell structure is furthermore reliably avoided.

According to another embodiment of the process, the cell structure of the core can be constructed in such a way, to increase the mechanical strength of the core, that regions are formed which have a higher volume-related cell density than adjacently situated regions. Accordingly, cross-sectional regions in which high mechanical loading of the core is to be expected are formed with smaller cells than other cross-sectional regions, in which lower mechanical loading of the core is to be expected. In this way, an integral core involving little outlay, a low weight and high mechanical strength can advantageously be produced. Cross-sectional regions in which high mechanical loading of the core is to be expected can be, in particular, regions which are provided for installing joining or fastening devices, such as screws, rivets, bolts or the like. Regions in which local inserts are to be embedded can also be regions subject to high mechanical loads.

As an alternative, the cell structure of the core can be constructed in such a way, to increase the mechanical strength of the core, that regions are formed in which the cells are formed with cell walls composed of a material which has a higher mechanical strength than the cell walls of the cells in adjacently situated regions. In this case, the cell walls in cross-sectional regions in which high mechanical loading of the core is to be expected are formed from a more robust or more stable material than other cross-sectional regions in which lower mechanical loading of the core is to be expected. This offers the advantage that the individual cells can each be constructed with an identical geometry, simplifying the effort involved in modeling the core and controlling the 3-D printing device for building up the core.

According to another alternative, the cell structure of the core can be constructed in such a way, to increase the mechanical strength of the core, that regions are formed in which the cell walls of the cells have a greater wall thickness than the cell walls of the cells in adjacently situated regions.

According to another alternative, the cell structure of the core can be constructed in such a way, to increase the mechanical strength of the core, that regions are formed in which the cells are filled with a filling material.

According to another embodiment of the process, a surface inspection to detect surface defects is carried out during the formation of the first covering layer and/or during the production of the core and/or during the formation of the second covering layer. Thus, it is possible to inspect the quality of the respective fiber tapes ply produced even during the deposition of the covering layers. This can be achieved by means of an optical or acoustic method, for example. In particular, a camera or an ultrasonic sensor can be attached to a deposition head which deposits the fiber tapes in order to detect surface defects or foreign bodies. It is also possible to inspect the surface of the respectively applied material layer of the core for defects optically or acoustically during the production of the core. Carrying out the respective inspection simultaneously with the production of the respective component of the sandwich component further shortens the production process.

As an alternative or in addition, it is possible to make provision for the sandwich component overall to be inspected in a nondestructive manner for component defects, e.g., delamination of the covering layers, faults or inclusions of foreign bodies in the covering layers and in the core, after the formation of the second covering layer. For this purpose, the sandwich component can be irradiated with x-rays, for example.

According to another aspect of the invention, a core is provided for a sandwich component which has a cell structure which is built up in a thickness direction by means of an additive production process and which has a multiplicity of cells. In particular, the core can be produced in the manner described above and can accordingly have the above-described features of the core.

In particular, the cells can be formed with a plurality of cell walls as closed cells.

In particular, provision can be made for the cell structure of the core to have a deposition boundary region which, in relation to the thickness direction, has a higher volume-related cell density than an inner region of the cell structure adjoining it in the thickness direction.

Provision can furthermore be made for the cells which form a deposition surface of the core in relation to the thickness direction to be filled with a filling material.

According to another embodiment, it is possible, in order to increase the mechanical strength of the core, for the cell structure to have regions
  which have a higher volume-related cell density than adjacently situated regions,
  in which the cells have cell walls composed of a material which has a higher mechanical strength than the cell walls of the cells in adjacently situated regions, or
  in which the cell walls of the cells have a greater wall thickness than the cell walls of the cells in adjacently situated regions, or
  in which the cells are filled with a filling material.

According to another embodiment of the core, the cell structure has a peripheral boundary region which extends in a transverse direction transversely to the thickness direction from a peripheral boundary of the cell structure, wherein the peripheral boundary region has a higher volume-related cell density than an inner region of the cell structure adjoining the peripheral boundary region in the transverse direction. In general, the core has a sheet-like extent bounded by a peripheral boundary. According to the embodiment under consideration, a cross-sectional region of the core extending from the peripheral boundary is provided which extends over a discrete distance into the interior of the core and is referred to as the peripheral boundary region. In this peripheral boundary region, the cells of the cell structure which form the cross section of the core have a smaller volume than in a cross-sectional region adjoining said peripheral boundary region. In this way, a larger quantity of material is present per cell in the peripheral boundary region, thus, on the one hand, improving the mechanical strength of the core and, on the other hand, advantageously making it easier to install fastening devices, such as screws, rivets, bolts or the like, in the peripheral boundary region. For this purpose, it is also possible, as an alternative, to make provision for the cells of the peripheral boundary region to be filled with a filling material.

According to another embodiment of the core, it is also possible to make provision for a connecting section for positive fixing of the core to be formed in the peripheral boundary region. For example, the connecting section can be formed by a pin sticking out from the peripheral boundary or projecting therefrom or by a recess extending into the cross section of the core from the peripheral boundary. In this way, the core can be coupled positively to additional cores in a particularly simple way, facilitating the assembly of sandwich components which have the core.

The features and advantages of the core which have been described in connection with the process according to the invention apply in analogous fashion to the core described in accordance with this aspect of the invention.

According to another aspect of the invention, a sandwich component is provided. The sandwich component has a first covering layer composed of a fiber composite material, a second covering layer composed of a fiber composite material, and a core arranged between the first and the second covering layer, wherein the core is designed in accordance with one of the embodiments described above. The sandwich component can be produced in a particularly simple and efficient manner by means of the process described above, for example.

Here, a "fiber material" is understood in general to mean a material which is formed from a multiplicity of reinforcing fibers, in particular in the form of threads or pieces of thread, e.g., carbon, glass, ceramic, aramid, boron, mineral, natural or synthetic fibers or mixtures thereof.

Here, "fiber tapes" or "prepreg tapes" or a "semifinished fiber product" is understood to mean a fiber material which is impregnated with a resin or matrix material, e.g., a thermosetting, thermoplastic, an elastomer resin or, more generally, a synthetic resin or the like, or the fibers of the fiber material are embedded in the resin or matrix material. Here, the fiber or prepreg tapes are made up into tapes extending in a longitudinal direction. In particular, the semifinished fiber product can be formed into a continuous mat or plate extending in a sheet-like manner, which has a plurality of plies of a fiber material which are stacked one on top of the other, wherein the fibers in adjacent plies preferably extend in different directions.

In the sense according to the present application, 3-D printing processes comprise all generative or additive manufacturing processes in which objects of predefined shape are produced from shapeless materials, such as liquids and powders or semifinished products of neutral shape, such as tape- or wire-shaped material, by means of chemical and/or physical processes on the basis of geometric models in a special generative manufacturing system. In the sense according to the present application, 3-D printing processes use additive processes, in which the starting material is built up sequentially layer by layer in predetermined shapes.

Here, components formed "as a single piece", "as a single part", "integrally" or "in one piece" are understood in general to mean that these components are present as a single part forming a material unit and, in particular, are produced as such, wherein it is not possible to detach one from the other component without destroying the material cohesion.

In respect of direction indications and axes, in particular direction indications and axes which relate to the profile of physical structures, extension of an axis, a direction or a structure "along" another axis, direction or structure is understood herein to mean that they, in particular the tangents resulting at a particular point on the structures, each extend at an angle of less than or equal to 45 degrees, preferably less than 30 degrees and, in particular, preferably extend parallel to one another.

In respect of direction indications and axes, in particular direction indications and axes which relate to the profile of physical structures, extension of an axis, a direction or a structure "transversely" to another axis, direction or structure is understood herein to mean that they, in particular the tangents resulting at a particular point on the structures, each extend at an angle of greater than or equal to 45 degrees, preferably greater than or equal to 60 degrees and, in particular, preferably extend perpendicularly to one another.

BRIEF DESCRIPTION OF THE DRAWINGS

The invention is explained below with reference to the figures of the drawings. In the figures.

In the figures, the same reference signs denote identical or functionally identical components unless otherwise stated.

BRIEF DESCRIPTION OF THE DRAWINGS

Figure 1:
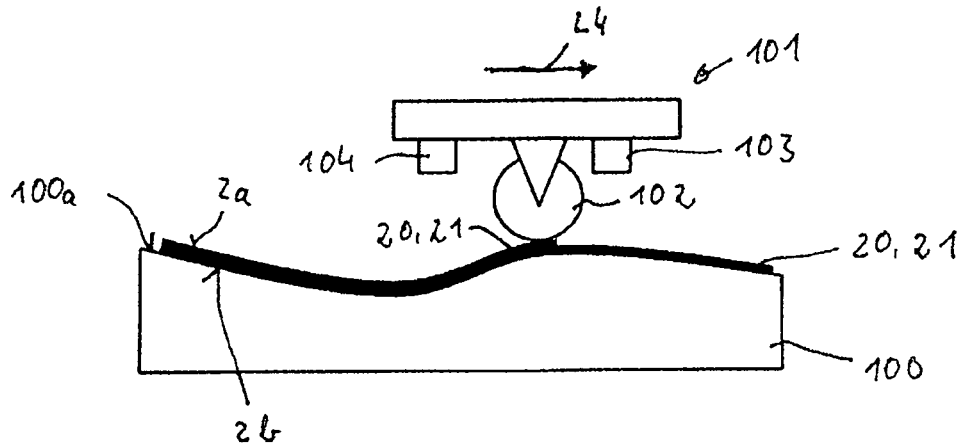
FIG. 1 shows a schematic view of a first step of a process for producing a sandwich component according to one illustrative embodiment of the present invention.
Figure 2:
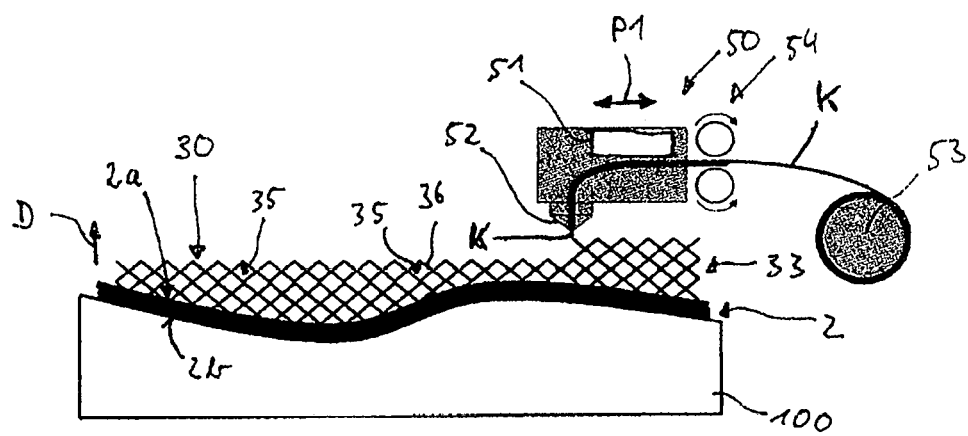
FIG. 2 shows a schematic view of a further step of the process according to one illustrative embodiment of the present invention.
Figure 3:
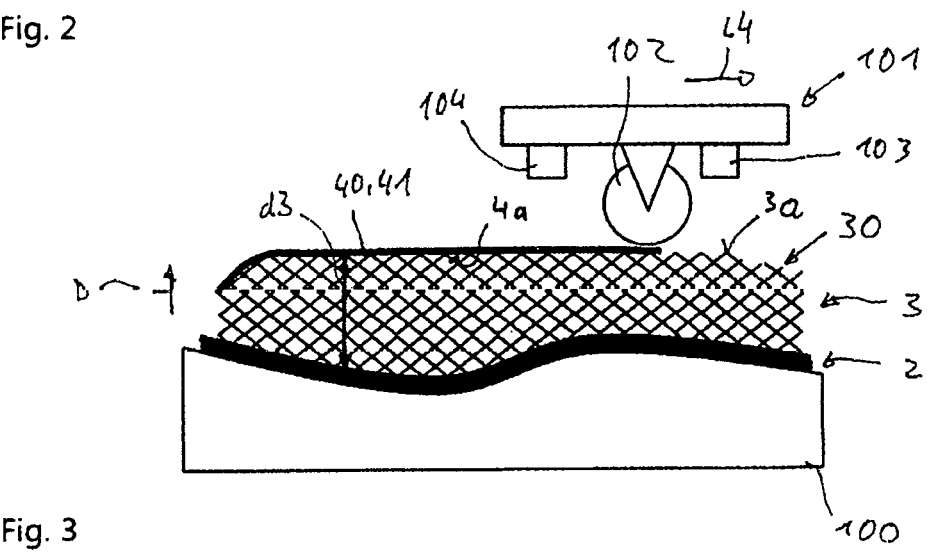
FIG. 3 shows a schematic view of a further step of the process according to one illustrative embodiment of the present invention.

FIGS. 1 to 3 show schematically the progress of a process for producing a sandwich component 1.

FIG. 1 shows a first step of the process, in which a first covering layer 2 of the sandwich component 1 is formed. The first covering layer 2 is optionally formed by depositing fiber tapes 20 on a molding surface 100a of a molding tool 100. The fiber tapes 20 each have fibers F, which are embedded in a matrix material M, in particular in a thermoplastic matrix material, e.g., PPS or PEEK. The first covering layer 2 is formed by depositing at least one sheet-like continuous ply 21 of fiber tapes 20. As an option, a plurality of plies 21 can be deposited one on top of the other, as shown by way of example in FIG. 1. In this case, the fiber tapes 20 in adjacent plies 21 preferably have different fiber orientations. The fiber tapes 20 are optionally deposited in a state in which the matrix material M is in a viscous state of aggregation, at least at the surface of the respective fiber tape 20. As an alternative, the matrix material M is converted to a viscous state by supplying heat immediately after deposition. As a result, the individual fiber tapes 20 and, where applicable, the individual plies 21 melt, and a monolithic first covering layer 2 extending in a sheet-like manner is formed. The first covering layer 2 can also be formed by laying a semifinished fiber product (not shown) against the molding surface 100a. During this process, a sheet-like mat, which comprises a plurality of plies of a fiber material impregnated with matrix material, is pressed against the molding surface 100a and thereby deformed in accordance with the surface contour of the molding surface 100a. Here, the matrix material is in a state suitable for deformation. Application to the molding surface 100a can be accomplished, for example, by applying a vacuum to the molding surface 100a, by means of a pressure ram (not shown), by means of a roll (not shown) or in a similar way.

In particular, the molding surface 100a of the molding tool 100 can be a surface that can be described three-dimensionally, as shown by way of example in FIGS. 1 to 3, or a flat surface. The configuration of the molding surface 100a defines the form or profile of the first covering layer 2.

The deposition of the fiber tapes 20 can be accomplished by means of a deposition head 101, for example, as illustrated schematically in FIG. 1. For this purpose, the deposition head 101 has one or more guiding or deposition rollers 102, by means of which the fiber tapes 20 are guided to the surface on which they are to be deposited and by means of which they are optionally pressed against said surface.

As shown schematically in FIG. 1, the deposition head 101 can furthermore have an optional heating device 103 and a likewise optional inspection device 104. The optional heating device 103 is used to bring about slight melting of the matrix material M of the fiber tapes 20. The inspection device 104 can be designed as a camera or as an ultrasonic detector, for example, and is used for the optional surface inspection of the surfaces of the fiber tapes 20 during deposition in order to detect surface defects.

To form the first covering layer 2, the deposition head 101 is moved in a deposition direction L4 along the molding surface 100a of the molding tool 100, and the fiber tapes 20 are laid against the molding surface 100a or, where applicable, against the already deposited ply 20 by means of the roller 102. During this process, the fiber tapes 20 can optionally be heated by means of the heating device 103 during deposition. As an alternative or in addition, the surface of the deposited fiber tapes 20 is optionally inspected for surface defects or deposition faults by means of the inspection device 104 during the deposition process. After the formation of the first covering layer 2, an outer surface 2b of the covering layer 2 rests on the molding surface 100a. An inner surface 2a of the covering layer 2 is oriented in the opposite direction to the outer surface 2b.

In a further step of the process, which is illustrated schematically in FIG. 2, a core 3 of the sandwich component 1 is produced. For this purpose, a cell structure 30 having a multiplicity of cells 35 is built up in a thickness direction D on the first covering layer 2 by means of an additive or generative production process. This can be achieved, for example, by means of an FDM 3-D printing process of the kind illustrated schematically in FIG. 2. Here, FDM is an abbreviation for "fused deposition modeling". As shown in FIG. 3, the cells 35 are in this case produced by means of a 3-D printing device 50. This device is guided along the inner surface 2a of the first covering layer 2 in accordance with the desired profile of cell walls 36 forming cells 35, as indicated symbolically by the arrow P1 in FIG. 2. The 3-D printing device 50 is preferably guided in a working plane above the inner surface 2a. The cell walls 36 are produced by liquefying a wire- or tape-shaped plastics material K by heating by means of a heating device 51 provided in the 3-D printing device 50 and applying it to the inner surface 2a of the first covering layer 2 by extrusion by means of a nozzle 52 of the 3-D printing device 50. On the surface, the plastics material hardens by cooling. Meanwhile, the cells 35 are built up by repeatedly traversing a respective working plane and then moving the working plane upward in a stacking action, i.e., in the thickness direction D, i.e., the distance from the inner surface 2a is increased. The cell structure 30 is thereby formed layer by layer in the thickness direction D.

As illustrated by way of example and schematically in FIG. 2, the 3-D printing device 50 can have a supply roller 53 for storing and supplying the plastics material K in tape form and a guiding device 54, e.g., in the form of a pair of rolls, as illustrated in FIG. 2 for guiding the tape-shaped plastics material K.

The core 3 produced in the manner described above has a sheet-like extent along the inner surface 2a of the first covering layer 2. As shown in FIG. 3, the cell structure 30 of the core 3, in particular the cell walls 36 of the outermost cells 35 of the cell structure 30 in relation to the thickness direction D, forms a deposition surface 3a of the core 3. The thickness d3 of the core 3 in relation to the thickness direction D can vary along the sheet-like extent of the core 3, as illustrated by way of example in FIG. 3, or can be constant.

As the plastics material K, it is possible, in particular, to use a thermoplastic material, e.g., polycarbonate, PC for short, polyetherimide, PEI for short, or similar thermoplastics.

In a further step of the process, which is illustrated schematically in FIG. 3, a second covering layer 4 of the sandwich component 1 is formed. For this purpose, fiber tapes 40 are preferably deposited on the deposition surface 3a of the core 3. In particular, the fiber tapes 40 can be of identical design to the above-described fiber tapes 20 used to form the first covering layer 2. The second covering layer 4 is formed by depositing at least one sheet-like continuous ply 41 of fiber tapes 40. As an option, a plurality of plies 41 can be deposited one on top of the other. The fiber tapes 40 are optionally deposited in a state in which the matrix material M is in a viscous state of aggregation, at least at the surface of the respective fiber tape 40. As an alternative, the matrix material M is converted to a viscous state by supplying heat immediately after deposition. As a result, the individual fiber tapes 40 and, where applicable, the individual plies 41 melt, and a monolithic second covering layer 4 extending in a sheet-like manner is formed and simultaneously joined to the core 3.

The second covering layer 4 can also be formed by laying a semifinished fiber product (not shown) against the deposition surface 3a of the core 3. During this process, a sheet-like mat, which comprises a plurality of plies of a fiber material impregnated with matrix material, is pressed against the deposition surface 3a and thereby deformed in accordance with the surface contour of the deposition surface 3a. Here, the matrix material is in a state suitable for deformation. Application to the deposition surface 3a can be accomplished, for example, by applying a vacuum to the deposition surface 3a, by means of a second pressure ram (not shown), by means of a roll (not shown) or in a similar way.

During the production of the core 3, a surface inspection can optionally be carried out to detect defects in the cell structure. This can be achieved, for example, by means of an optional inspection device (not shown) provided on the 3-D printing device 50, in particular in the form of a camera or of an ultrasonic detector.

For deposition of the fiber tapes 40, it is possible to use the above-described deposition head 101 in the same way as for the formation of the first covering layer 2. In particular, the fiber tapes 40 can optionally be heated by means of the heating device 103 during deposition. It is also possible as an option to inspect the surface of the deposited fiber tapes 40 for surface defects or deposition faults by means of the inspection device 104 during the deposition process. After the formation of the second covering layer 4, an inner surface 4a of the second covering layer 4 rests on the deposition surface 3a of the core 3 or is joined materially thereto.

Figure 4:
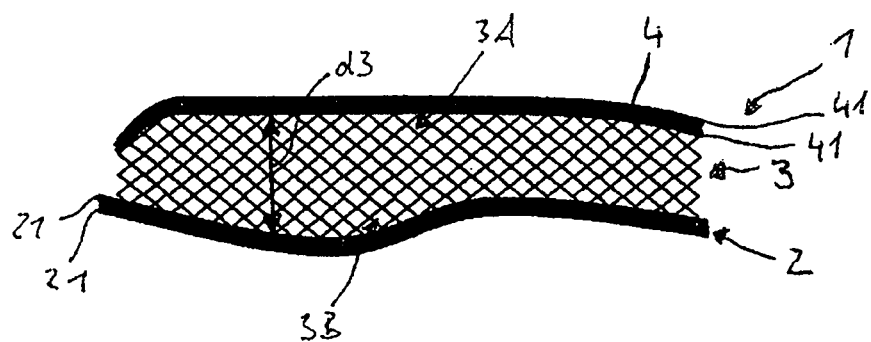
FIG. 4 shows a schematic sectional view of a sandwich component according to one illustrative embodiment of the present invention.

FIG. 4 shows a sandwich component 1 produced in accordance with the process described, having the first covering layer 2, the second covering layer 4 and the core 3 arranged between the first covering layer 2 and the second covering layer 4.

A core 3 for a sandwich component 1 is described below. It is possible, in particular, for this core to be produced directly on the first covering layer 2 in the process explained with reference to FIGS. 1 to 3, by means of an additive or generative production process, as described above. Alternatively, the core 3 can be produced on a contoured surface provided specially for this purpose, e.g., the molding surface 100a of the molding tool 100, by means of an additive or generative production process. To produce the core 3 by means of an additive or generative production process, the FDM process explained with reference to FIG. 2 can be carried out, for example, wherein the cell walls 36 forming the individual cells 35 of the cell structure 30 are formed by layered application of the plastics material K in accordance with the desired cell wall profile described in detail below.

Figure 5:
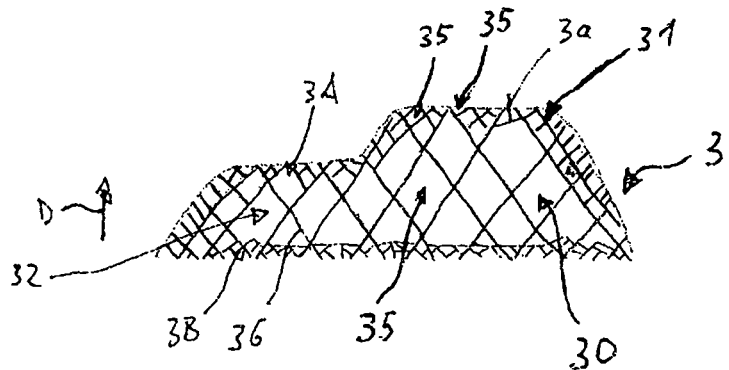
FIG. 5 shows a schematic sectional view of a core according to one illustrative embodiment of the present invention.
Figure 6:
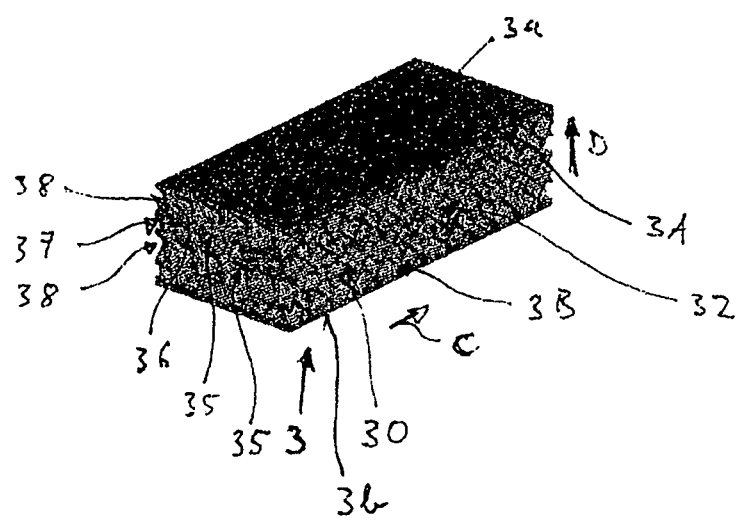
FIG. 6 shows a schematic sectional view of a core according to another illustrative embodiment of the present invention.

FIGS. 5 and 6 each show a core 3 with a cell structure 30 that is built up in a thickness direction D by means of an additive production process and that has a multiplicity of cells 35. The cells 35 are each formed by a plurality of cell walls 36 and, in particular, can be in the form of closed cells 35. The core 3 has a sheet-like extent, in particular along a transverse direction C extending transversely to the thickness direction, as can be seen from FIG. 6, for example. The core 3 furthermore has a first thickness boundary region 3A and a second thickness boundary region 3B situated on the opposite side from the latter in relation to the thickness direction D. The outermost cells 35 of the second thickness boundary region 3B in relation to the thickness direction D or the cell walls 36 which form said cells form a buildup or contact surface 3b of the core 3. During the above-described process for producing a sandwich component 1, the contact surface 3b rests against the inner surface 2a of the first covering layer 2, and the second thickness boundary region 3B is produced first during the building up of the cell structure 30. The outermost cells 35 of the first thickness boundary region 3A in relation to the thickness direction D or the cell walls 36 forming said cells form the deposition surface 3a of the core 3, on which the fiber tapes 40 are deposited to form the second covering layer 4. The first thickness boundary region 3A thus forms a deposition boundary region 31 of the cell structure 30.

As shown by way of example in FIG. 5, the deposition boundary region 31 can have a larger volume-related cell density than an inner region 32 of the cell structure 30 which adjoins it in the thickness direction D. The inner region 32 of the cell structure 30 is situated between the first and the second thickness boundary region 3A, 3B of the core 3 in relation to the thickness direction D. As an option, the cell structure 30 can additionally also have a larger volume-related cell density in the second thickness boundary region 3B of the core 3 than in the inner region 32, as shown by way of example in FIG. 5. In the case of the core 3 shown by way of example in FIG. 5, the cells 35 forming the inner region 32 of the cell structure 30 each have substantially the same size or the same volume. In the above-described process for producing a sandwich component 1, it is thus the second thickness boundary region 3B of the core 3 which is formed first during the building up of the cell structure 30 by means of a 3-D printing process, optionally as a contact boundary region with a high volume-related cell density, as shown in FIG. 5. The inner region 32 and, after that, the first thickness boundary region 3A are then formed, wherein a deposition boundary region 31 with a higher volume-related cell density than the inner region 32 is optionally formed in or by the first thickness boundary region 3A. By means of the respective optionally increased cell density in the first and the second thickness boundary region 3A, 3B, the contact surface for contact with the covering layers 2, 4 is in each case increased. This results in improved adhesion of the covering layers to the core 3 and higher mechanical stiffness of the core 3.

FIG. 6 shows, by way of example, a core 3 on which the cells 35 forming the deposition surface 3a of the core 3 are filled with a filling material. As can be seen in FIG. 6, the outermost cells 35 of the first thickness boundary region 3A or of the deposition boundary region 31 in relation to the thickness direction D are here filled with filling material. In this way, openings or apertures bounded by the cell walls 36 are filled, thus forming a continuous deposition surface 3a, as shown by way of example in FIG. 6. As an option, the outermost cells 35 of the second thickness boundary region 3B in relation to the thickness direction D can also be filled with a filling material. The filling of the cells 35 can be carried out during the production of the cells 35 by means of the additive production process as the cell structure 30 is built up, for example.

Figure 13:
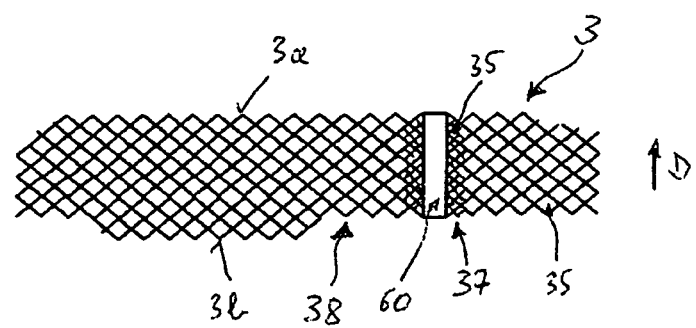
FIG. 13 shows a schematic sectional view of a core according to another illustrative embodiment of the present invention.
Figure 1:
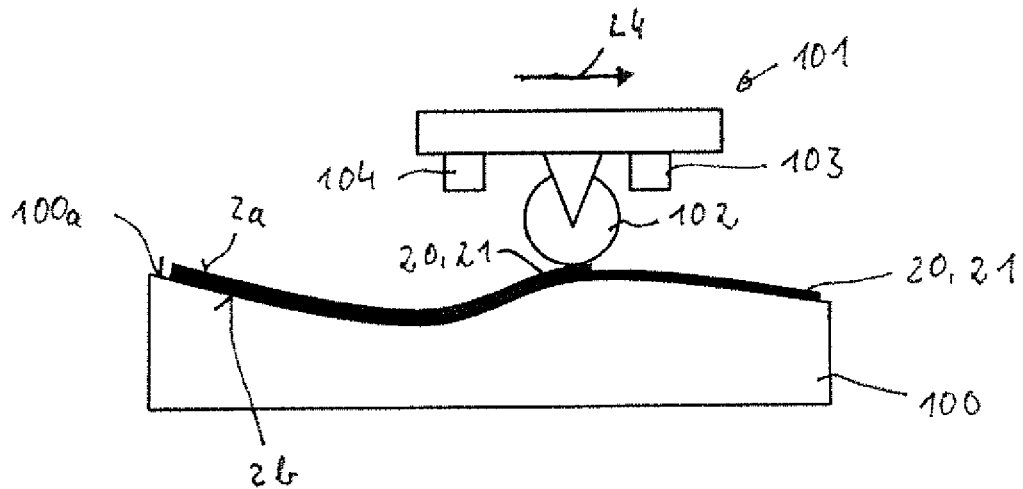
Figure 2:
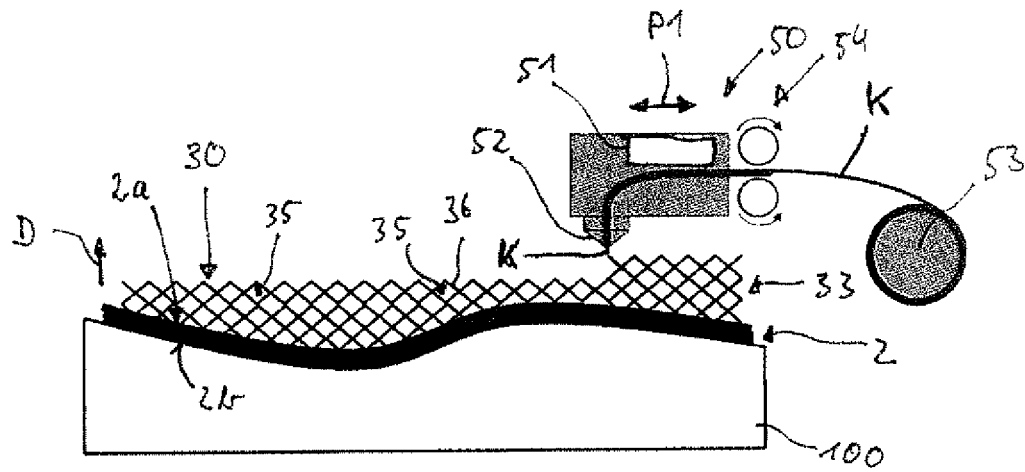
Figure 3:
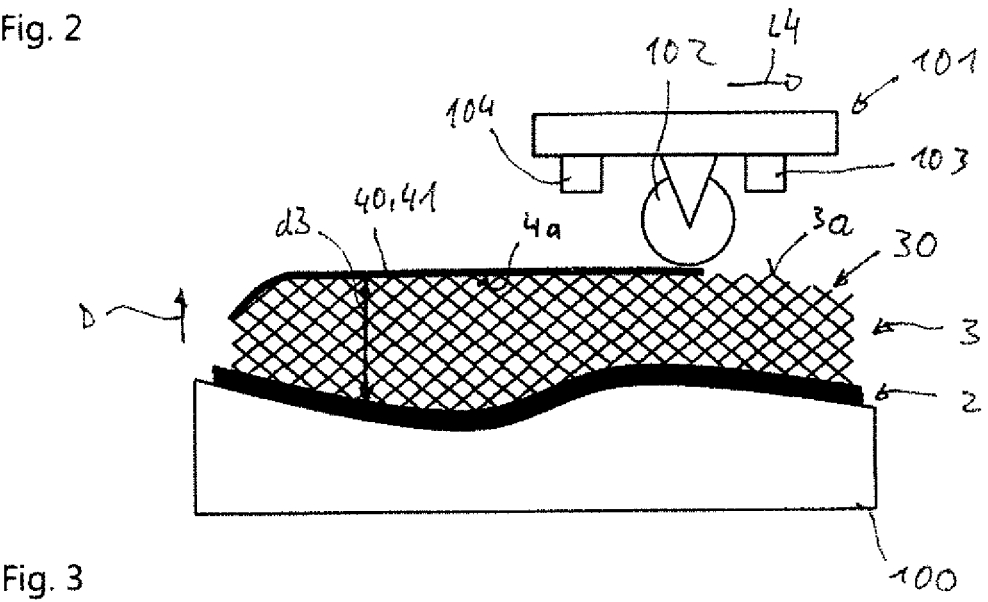
Figure 4:
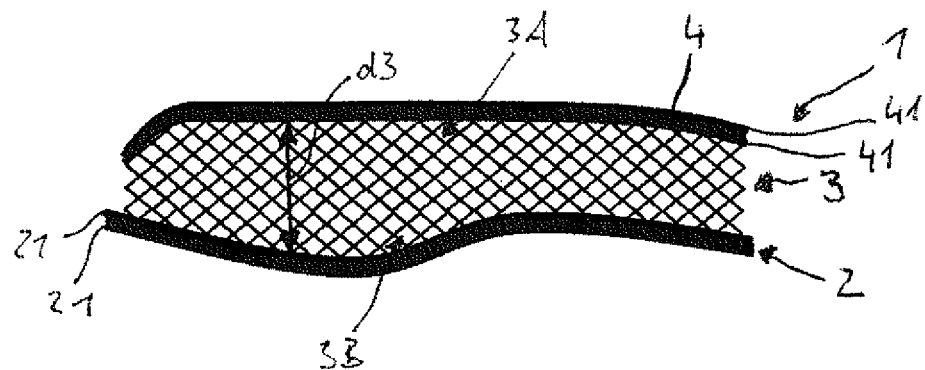
Figure 5:
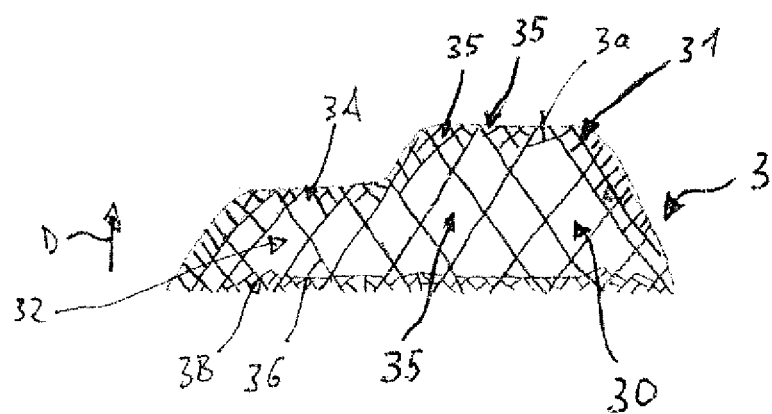
Figure 6:
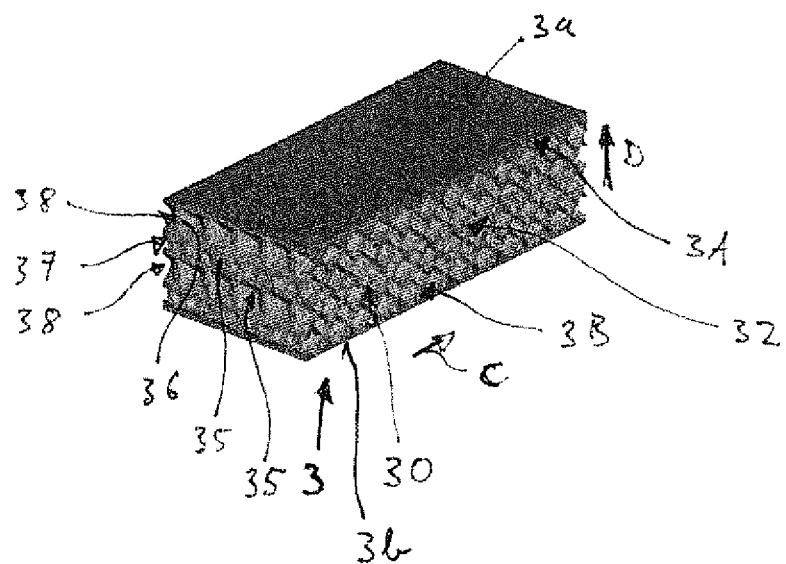
Figure 7:
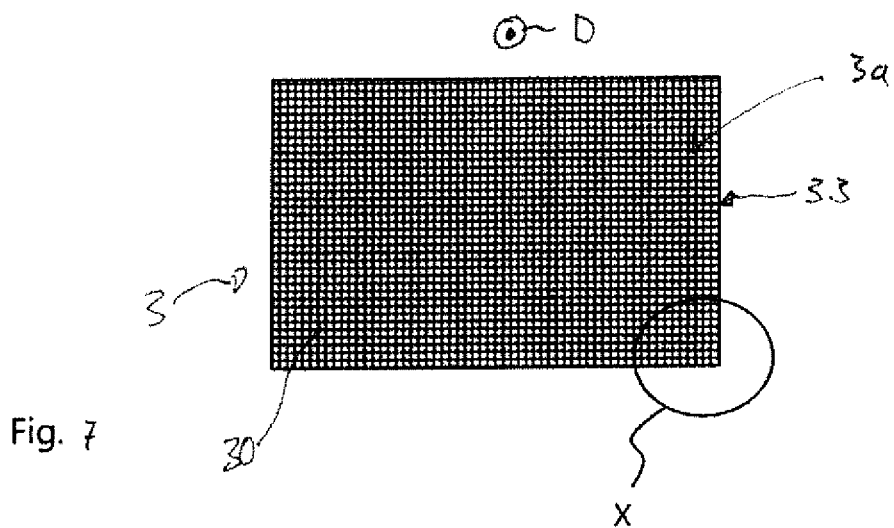
Figure 8:
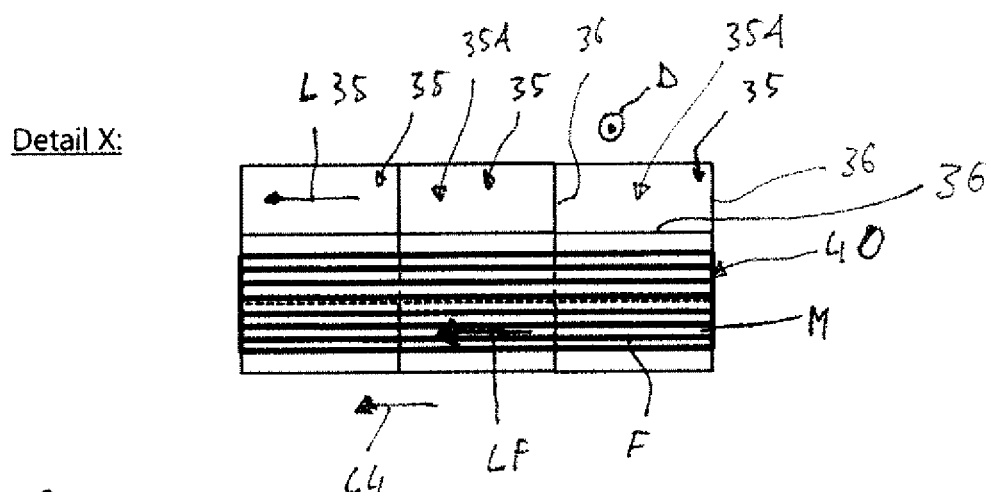
Figure 9:
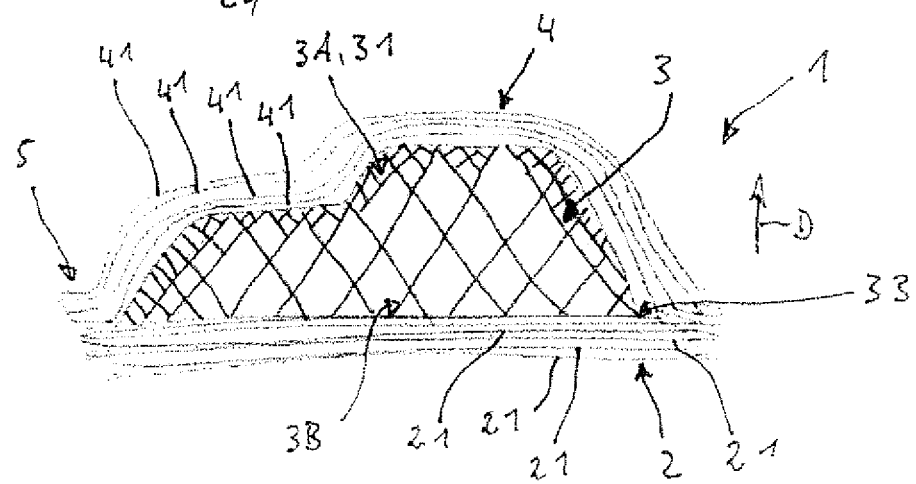
Figure 10:
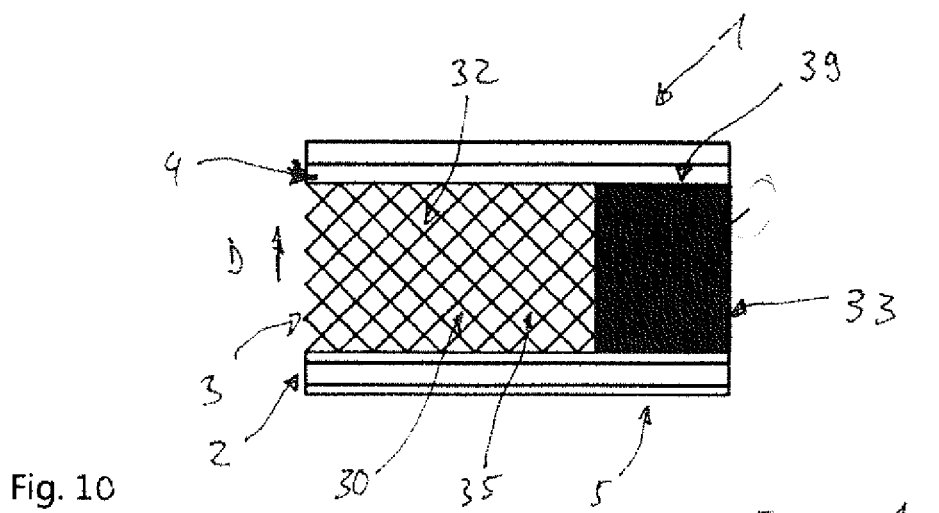
Figure 11:
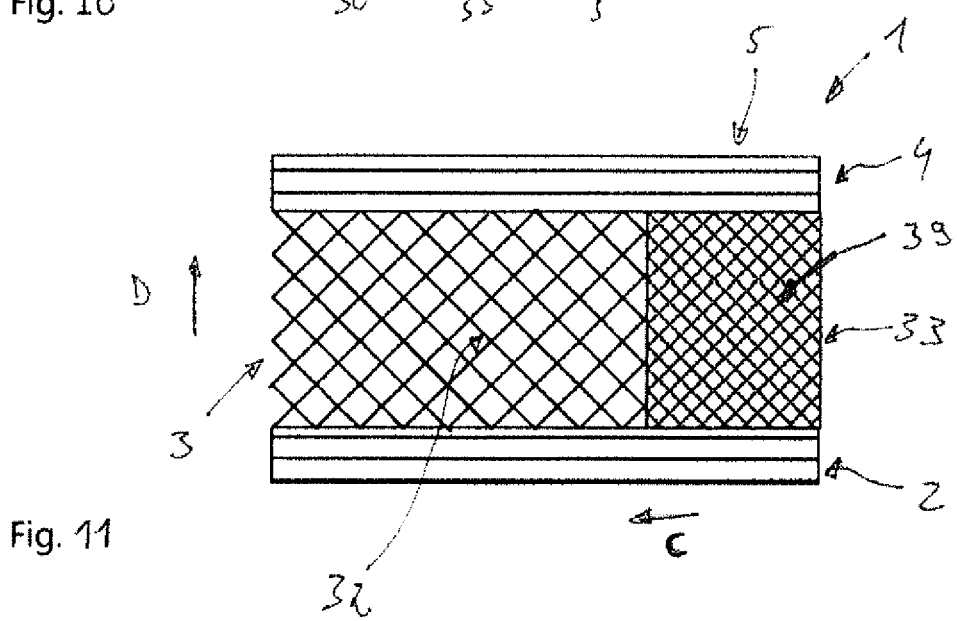
Figure 12:
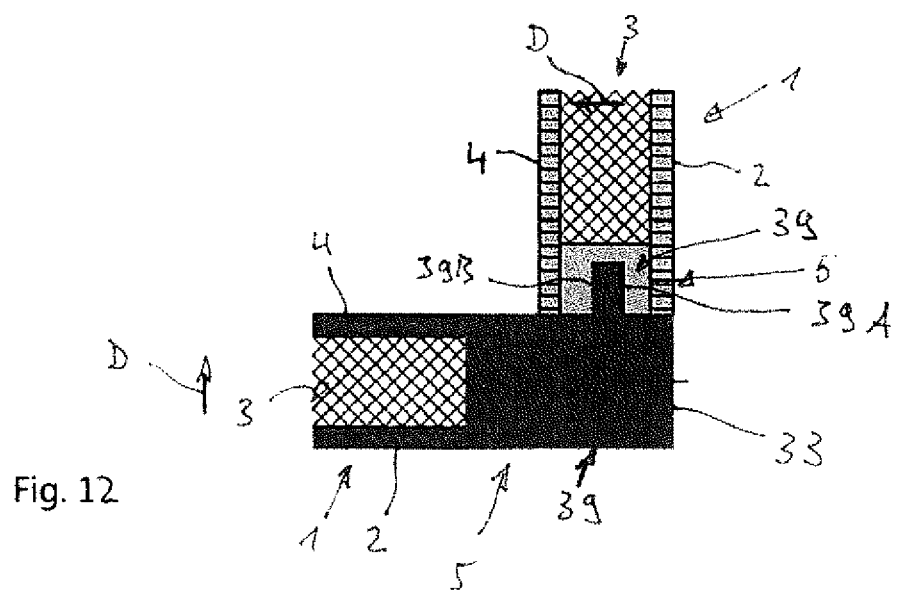
Figure 13:
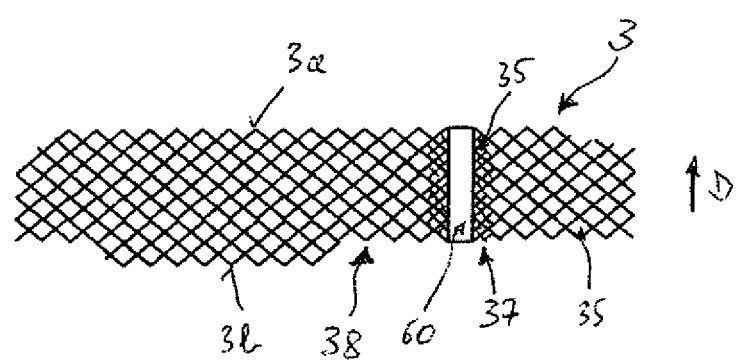

As FIGS. 6 and 13 furthermore show, it is possible to increase the mechanical strength of the core 3 by providing regions 37 within the cell structure 30 which have a higher volume-related cell density than adjacently situated regions 38. In the case of the core 3 shown by way of example in FIG. 6, a first subregion 37 with a high cell density, which extends transversely to the thickness direction D, is provided in the inner region 32. This first subregion 37 is situated between two second subregions 38 in relation to the thickness direction D, said subregions each having a lower volume-related cell density than the first subregion 37. As an alternative or in addition, it is also possible to make provision for the cell walls 36 of the cells 35 of the first subregion 37 to be formed from a material which has a higher mechanical strength than the material of the cell walls 36 of the cells 35 in the second subregions 38. Furthermore, the cell walls 36 of the cells 35 of the first subregion 37 can also have a greater wall thickness than the cell walls 36 of the cells 35 in adjacently situated subregions 38.

In the case of the core 3 shown by way of example in FIG. 13, a first subregion 37 is provided which extends along the thickness direction D between the deposition surface 3a and the contact surface 3b of the core 3 which is situated on the opposite side in relation to the thickness direction D. In particular, the first subregion 37 can be of column-like design, as shown by way of example in FIG. 13, and has a higher volume-related cell density than the second subregions 38 surrounding it. Of course, it is also possible, instead of the increased cell density, to make provision for the cells 35 of the first subregion 37 to be filled with a filling material, to be formed with a greater wall thickness or to be formed from a more robust material than the cells 35 of the second subregions 38. FIG. 13 furthermore shows, by way of example, that an aperture 60 extending between the deposition surface 3a and the contact surface 3b can be formed in the first subregion 37. This aperture can be provided, for example, to accommodate a fastening device, e.g., a bolt or the like.

Figure 7:
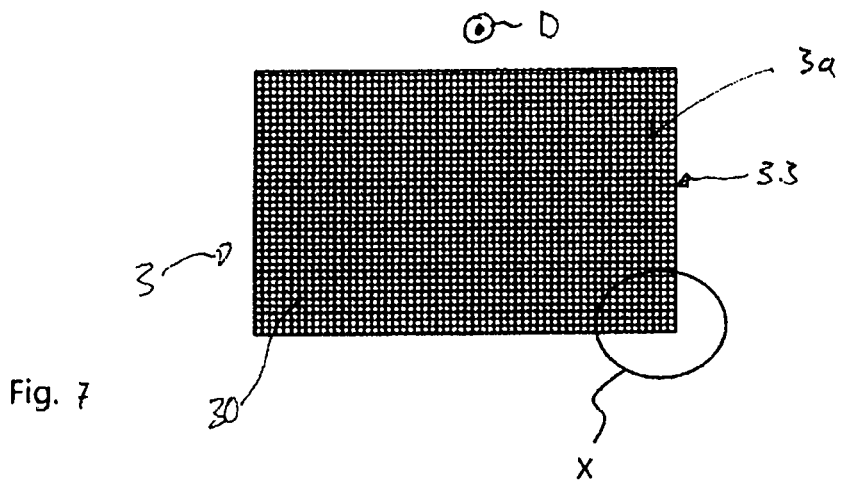
FIG. 7 shows a schematic plan view of a deposition surface of a core according to another illustrative embodiment of the present invention.
Figure 8:
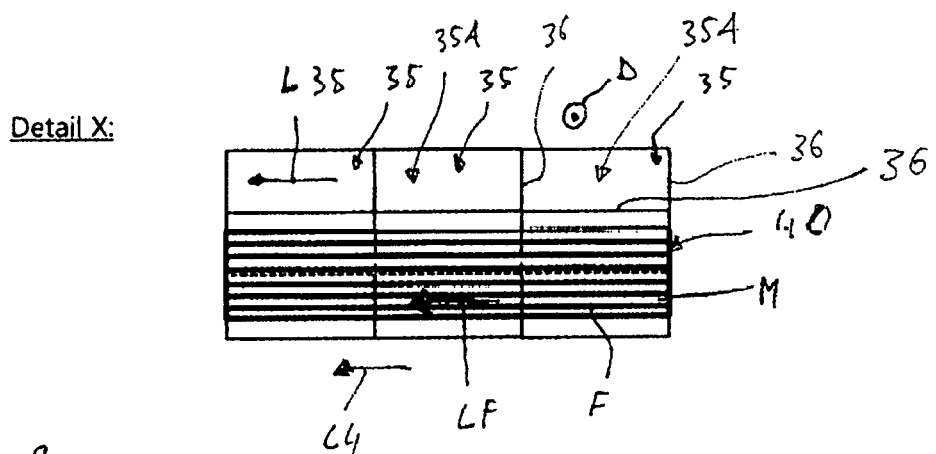
FIG. 8 shows a detail view of the region indicated by the letter X in FIG. 7.

FIGS. 7 and 8 each show a plan view of the deposition surface 3a of a core 3. In the plan view shown in FIG. 8, a fiber tape 40 is additionally illustrated which has been deposited on the deposition surface 3a of the core 3 in the formation of the second covering layer 4 during the above-explained process, for example. During the production of the core 3, the cells 35 forming the deposition surface 3a, i.e., the cells 35 situated on the opposite side from the first covering layer 2 in relation to the thickness direction D, are designed as open cells 35, at least in subregions of the sheet-like extent of the deposition surface 3a. This means that the cell walls 36 forming the cells 35 define openings or depressions 35A, as shown by way of example in FIG. 6. During the deposition of fiber tapes 40 onto the deposition surface 3a of the core 3, a situation where the fiber tapes 40 extending over the openings 35A sag should as far as possible be avoided, it being possible for this to occur, in particular, owing to the viscous state of the matrix material M, in order to avoid the formation of depressions in the second covering layer 4 of the sandwich component 1. In the case of the core 3 shown by way of example in FIG. 5, the risk of sagging is reduced by making the openings 35A as small as possible by means of the increased cell density in the deposition boundary region 31. In the case of the core 3 shown in FIG. 6, the openings 35A are filled. According to the optional configuration of the core 3 which is shown in FIG. 8, the cells 35 in the deposition boundary region 31 are aligned with their cell walls 36 corresponding to the deposition direction L4 of the fiber tapes 40 or are correspondingly designed. In FIG. 8, the cell walls 36 define a rectangular opening 35A with a longitudinal extent in the direction L35. This longitudinal extent L35 extends along the deposition direction L4, in which the fiber tapes 40 are deposited with their fiber longitudinal direction LF. In this way, the intrinsically stiff fibers F span the openings 35A longitudinally, thereby avoiding sagging.

FIGS. 9 to 12 show optional configurations of a sandwich component 1. In particular, the sandwich component 1 can be produced by the process described above and, in particular, has a core 3, which can be configured as described above.

Figure 9:
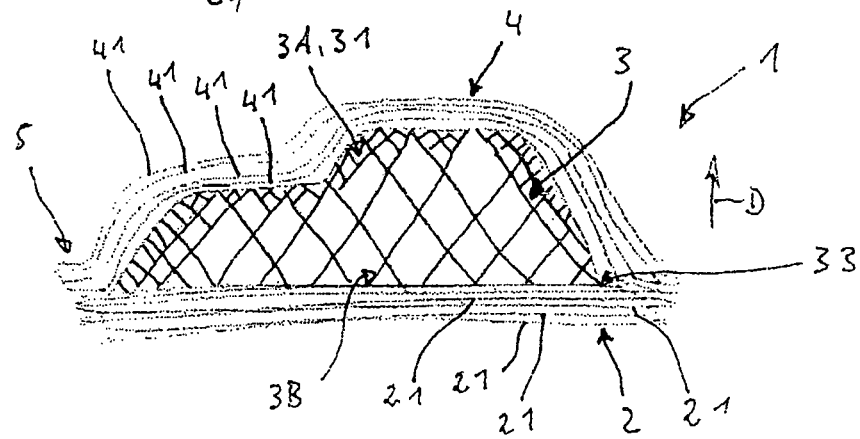
FIG. 9 shows a schematic sectional view of a sandwich component according to another illustrative embodiment of the present invention.

The sandwich component 1 shown by way of example in FIG. 9 has the core 3 shown in FIG. 5. This is arranged between a first covering layer 2 and a second covering layer 4 in relation to the thickness direction D. The first covering layer is joined to those cells 35 of the second thickness boundary region 3B of the core 3 which are furthest toward the outside in relation to the thickness direction D. The second covering layer 4 is joined to those cells 35 of the first thickness boundary region 3A of the core which are furthest toward the outside in relation to the thickness direction D or is joined to the deposition surface 3a of the core. As is furthermore shown in FIG. 9, the first covering layer 2 and the second covering layer 4 each extend beyond a peripheral boundary 33 of the core 3 or of the cell structure 30 of the core 3. Peripheral boundary 33 bounds or delimits or defines the sheet-like extent of the core 3. Those regions of the first covering layer 2 which project beyond the peripheral boundary 33 and those regions of the second covering layer 4 which project beyond the peripheral boundary 33 are joined to one another, in particular materially, and form a monolithic peripheral boundary region 5 of the sandwich component 1. In particular, the material joint can be formed during the deposition of the fiber tapes 40 as the second covering layer 4 is being formed if the fiber tapes 40 are deposited in the viscous state of the matrix material M, beyond the peripheral boundary 33 of the cell structure 30, on the inner surface 2a of the lower covering layer 2. In particular, the peripheral boundary region 5 can be used for the structural attachment of the sandwich component 1 and is suitable, for example, for the installation of fastening devices, such as screws, rivets, bolts and the like.

Figure 10:
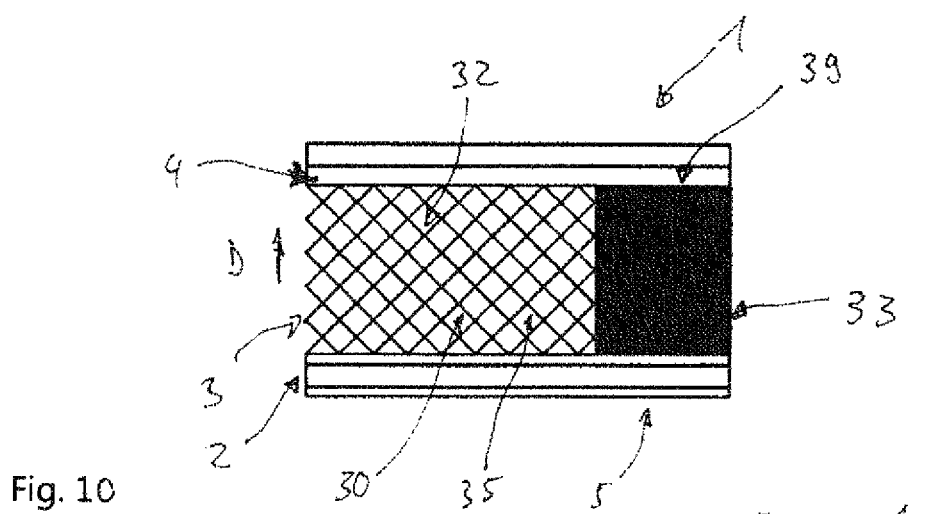
FIG. 10 shows a schematic sectional view of a sandwich component according to another illustrative embodiment of the present invention with a core according to another illustrative embodiment of the present invention.

FIG. 10 shows a cross-sectional view of another optional configuration of the peripheral boundary region 5 of the sandwich component 1. As shown by way of example in FIG. 10, the cell structure 30 of the core 3 has a peripheral boundary region 39 which extends from a peripheral boundary 33 of the cell structure 30, in particular transversely to the thickness direction D into the interior of the cell structure 30. The cells 35 of the peripheral boundary region 39 of the cell structure 30 are filled with a filling material, which can take place, in particular, during the building up of the cell structure 30. The cell structure 30 can thus be built up with a solid peripheral boundary region 39. Alternatively, the cells 35 of the peripheral boundary region 39 of the cell structure 30 can be filled subsequently with a filling material. The first and the second covering layer 2, 4 overlap the peripheral boundary region 39 of the cell structure 30 and end flush with the peripheral boundary 33 of the cell structure 30. Filling the cells 35 offers the advantage that penetration of liquid into the interior of the core 3 is reliably prevented. Furthermore, fastening devices, such as screws, rivets, bolts or the like, can be introduced into the filled cells 35 and anchored there with a high reliability and load-bearing capacity. Moreover, reliable adhesion between the core 3 and the covering layers 2, 4 is achieved in the outermost cells 35 in relation to the thickness direction D if these cells are likewise filled, as shown by way of example in FIG. 10.

Figure 11:
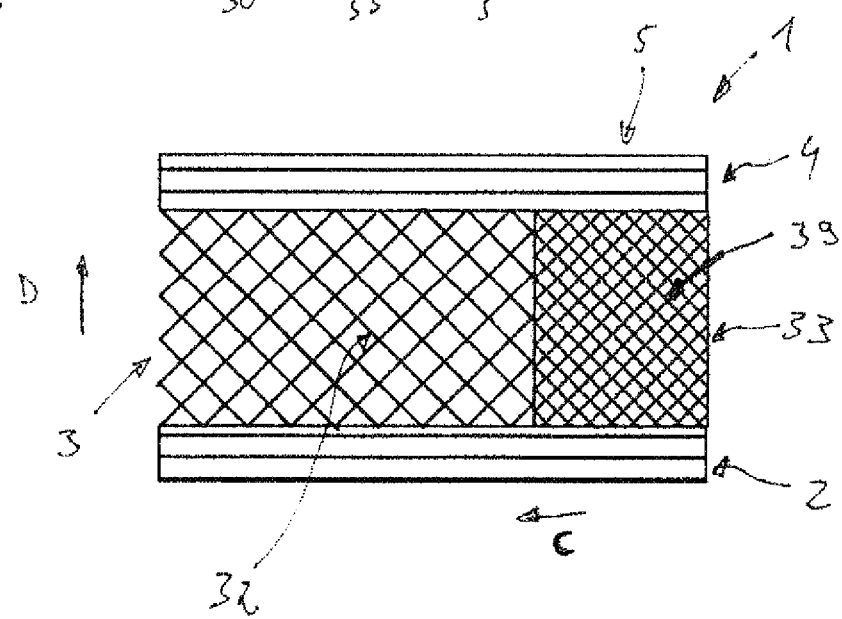
FIG. 11 shows a schematic sectional view of a sandwich component according to another illustrative embodiment of the present invention with a core according to another illustrative embodiment of the present invention.

FIG. 11 shows a cross-sectional view of another optional configuration of the peripheral boundary region 5 of the sandwich component 1. In contrast to FIG. 10, the cells 35 of the peripheral boundary region 39 of the cell structure 30 of the core 3 of the sandwich component 1 shown by way of example in FIG. 11 are not filled with a filling material but have a higher volume-related cell density than an inner region 32 of the cell structure 30 adjoining the peripheral boundary region 39. This offers the advantage that the mechanical stiffness of the core 3 is increased for a low weight thereof. In this configuration too, the installation of fastening devices in the peripheral boundary region 39 is made easier, and the adhesion between the core 3 and the covering layers 2, 4 is improved.

Figure 12:
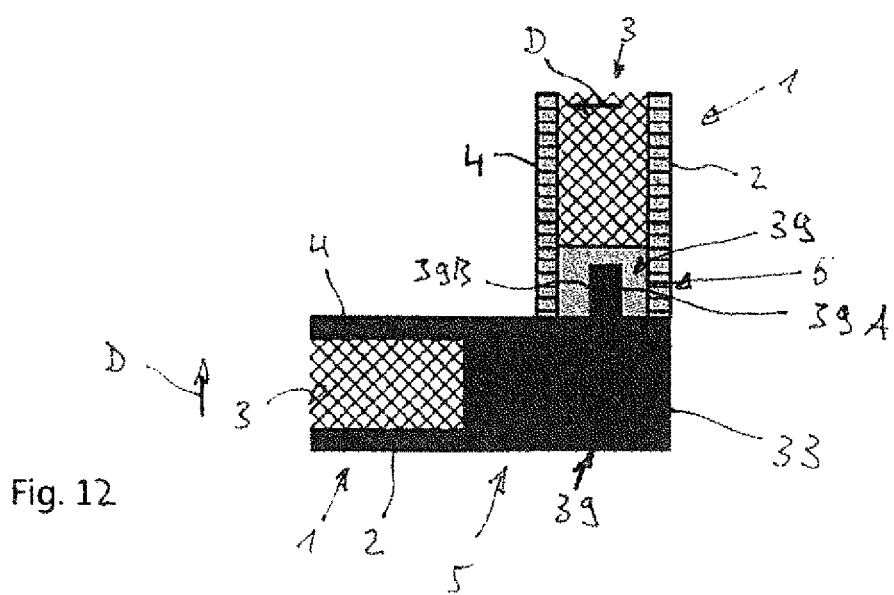
FIG. 12 shows a schematic sectional view of an arrangement of two sandwich components, each according to another illustrative embodiment of the present invention.

An arrangement of sandwich components 1 is shown in FIG. 12. In this case, the peripheral boundary regions 5 of the sandwich components 1 are coupled mechanically to one another. FIG. 12 also shows another optional configuration of the peripheral boundary regions 5 of the sandwich components 1. As explained with reference to FIG. 10, the peripheral boundary regions 39 of the cell structures 30 of the cores 3 of the sandwich components 1 are formed with filled cells 35 or are of solid design. As is furthermore shown in FIG. 12, a connecting section 39A, 39B is formed in the respective peripheral boundary region 39. In particular, the connecting section can be implemented in the form of a pin 39A or of a recess 39B. In FIG. 12, the peripheral boundary region 39 of the cell structure 30 of the core 3 of the sandwich component 1 which is at the bottom in the illustration in FIG. 12, has a pin 39A which projects from the peripheral boundary region 39 in the thickness direction D. Of course, it is also possible for the pin 39A to extend transversely to the thickness direction D from the peripheral boundary 33 or, more generally, from the peripheral boundary region 39. The peripheral boundary region 39 of the cell structure 30 of the core 3 of the sandwich component 1 which is at the top in FIG. 12 has a recess 39B which extends transversely to the thickness direction D from the peripheral boundary 33. Of course, it is also possible for the recess 39B to extend along the thickness direction D or, more generally, into the peripheral boundary region 39. As shown in FIG. 12, the pin 39A is introduced into the recess 39B, thereby ensuring positive fixing of the cores 3 to one another.

Although the present invention has been explained by way of example by means of illustrative embodiments above, it is not restricted thereto but can be modified in many different ways. In particular, combinations of the illustrative embodiments above are also conceivable.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 1 sandwich component
2 first covering layer
2*a* inner surface of the first covering layer
2*b* outer surface of the first covering layer
3 core
3A first thickness boundary region of the core
3*a* deposition surface of the core
3B second thickness boundary region of the core
4 second covering layer
4*a* inner surface of the second covering layer
5 peripheral boundary region of the sandwich component
20, 40 fiber tapes
21, 41 ply
30 cell structure of the core
31 deposition boundary region of the cell structure
32 inner region of the cell structure
33 peripheral boundary of the cell structure
35 cells
35A depressions
36 cell walls
37 region of the cell structure
38 region of the cell structure
39 peripheral boundary region of the cell structure
39A pin
39B recess
50 3-D printing device
51 heating device of the 3-D printing device
52 nozzle of the 3-D printing device
53 supply roller
54 guiding device
60 aperture
100 molding tool
100*a* molding surface
101 deposition head
102 deposition roller
103 heating device
104 inspection device
C transverse direction
D thickness direction
d3 thickness of the core
F fiber
K plastics material
L4 deposition direction
L35 longitudinal extent of the cells
LF fiber longitudinal direction
M matrix material
P1 arrow

The invention claimed is:

1. A sandwich component, comprising:
a first covering layer composed of a fiber composite material;
a second covering layer composed of a fiber composite material; and
a core arranged between the first and the second covering layer, wherein the core has a cell structure which is built up in a thickness direction by means of an additive production process and which has a multiplicity of cells in the thickness direction, wherein a plurality of cells adjacent the second covering layer form a deposition surface wherein the plurality of cells which form the deposition surface of the core in relation to the thickness direction are filled with a filling material during the additive production process and are adjacent in the thickness direction to a plurality of non-filled cells, wherein the deposition surface forms a continuous surface area of filled outermost cells in the thickness direction on which the second covering layer is deposited.

2. The sandwich component according to claim 1, wherein a deposition boundary region in relation to a thickness direction, has a higher volume-related cell density than an inner region of the cell structure adjoining the deposition boundary region in the thickness direction.

3. The sandwich component according to claim 1, wherein, to increase a mechanical strength of the core, the cell structure has regions
- which have a higher volume-related cell density than adjacently situated regions,
- in which the cells have cell walls composed of a material which has a higher mechanical strength than the cell walls of the cells in adjacently situated regions, or
- in which the cell walls of the cells have a greater wall thickness than the cell walls of the cells in adjacently situated regions.

4. The sandwich component according to claim 1, wherein the cell structure has a peripheral boundary region which extends from a peripheral boundary of the cell structure, wherein the peripheral boundary region has a higher volume-related cell density than an inner region of the cell structure adjoining the peripheral boundary region, or wherein the cells of the peripheral boundary region are filled with a filling material.

5. The core according to claim 4, wherein a connecting section, in a form of a pin or of a recess, for positive fixing of the core is formed in the peripheral boundary region.

* * * * *